US010801255B2

(12) United States Patent
Hermens et al.

(10) Patent No.: US 10,801,255 B2
(45) Date of Patent: Oct. 13, 2020

(54) INSULATING GLAZING WITH INCREASED BREAKTHROUGH-RESISTANCE AND AN ADAPTER ELEMENT

(71) Applicant: SAINT-GOBAIN GLASS FRANCE, Courbevoie (FR)

(72) Inventors: Ulrich Hermens, Aachen (DE); Rolf Kochs, Aachen (DE); Marcus Neander, Eschweiler (DE); Walter Schreiber, Aachen (DE); Adem Kircili, Eschweiler (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/481,162

(22) PCT Filed: Jan. 10, 2018

(86) PCT No.: PCT/EP2018/050489
§ 371 (c)(1),
(2) Date: Jul. 26, 2019

(87) PCT Pub. No.: WO2018/137924
PCT Pub. Date: Aug. 2, 2018

(65) Prior Publication Data
US 2019/0383087 A1 Dec. 19, 2019

(30) Foreign Application Priority Data
Jan. 30, 2017 (EP) .................................... 17153750

(51) Int. Cl.
*E06B 3/66* (2006.01)
*E06B 3/67* (2006.01)
(Continued)

(52) U.S. Cl.
CPC .......... *E06B 3/66366* (2013.01); *E06B 3/667* (2013.01); *E06B 3/66352* (2013.01); *E06B 3/67326* (2013.01); *E06B 2003/66395* (2013.01)

(58) Field of Classification Search
CPC .. E06B 3/66366; E06B 3/66352; E06B 3/667; E06B 3/67326; E06B 2003/66395
(Continued)

(56) References Cited

U.S. PATENT DOCUMENTS 2,138,374 A * 11/1938 Edwards ................ B61D 25/00 52/204.597
2,303,149 A * 11/1942 Verhagen .................. E06B 3/64 52/204.595
(Continued)

FOREIGN PATENT DOCUMENTS

CH 329 280 A 4/1958
DE 8027875 U1 * 2/1981 ............. F41H 5/263
(Continued)

OTHER PUBLICATIONS

International Search Report as issued in International Patent Application No. PCT/EP2018/050489, dated Mar. 19, 2018.

*Primary Examiner* — Jeanette E Chapman
(74) *Attorney, Agent, or Firm* — Pillsbury Winthrop Shaw Pittman LLP

(57) ABSTRACT

An adapter element for connecting a pane to a spacer having a fastening groove, wherein the adapter element includes at least one receiving profile for securing to the pane and at least one lower part for fixing to the spacer, and the lower part is designed to positively fit the fastening groove of the spacer.

15 Claims, 5 Drawing Sheets

Figure 1:
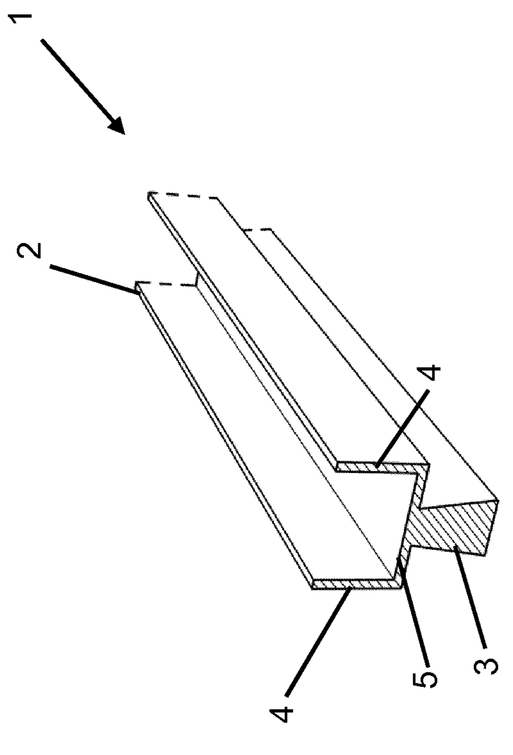

(51) Int. Cl.

| | |
|---|---|
| ***E06B 3/663*** | (2006.01) |
| ***E06B 3/667*** | (2006.01) |
| ***E06B 3/673*** | (2006.01) |

(58) Field of Classification Search

USPC ........................................................ 52/745.16

See application file for complete search history.

(56) References Cited

U.S. PATENT DOCUMENTS

| | | | | |
|---|---|---|---|---|
| 3,256,641 | A * | 6/1966 | Johnson | E06B 3/56 49/419 |
| 4,006,569 | A * | 2/1977 | Kain | E06B 3/5454 52/204.591 |
| 4,055,031 | A * | 10/1977 | Okawa | E06B 3/64 52/172 |
| 4,081,934 | A * | 4/1978 | Franz | E06B 3/66366 428/333 |
| 4,243,719 | A | 1/1981 | Holmes | |
| 5,131,194 | A * | 7/1992 | Anderson | E06B 3/62 52/144 |
| 6,289,641 | B1 | 9/2001 | McCandless | |
| 7,743,584 | B2 * | 6/2010 | Reichert | E06B 3/66323 428/34 |
| 10,414,130 | B2 * | 9/2019 | Ohmoto | G02B 5/282 |
| 2009/0139165 | A1 | 6/2009 | Prete et al. | |
| 2011/0300356 | A1 * | 12/2011 | Takamatsu | B32B 17/10 428/212 |
| 2017/0321472 | A1 * | 11/2017 | Frank | E06B 3/66366 |

FOREIGN PATENT DOCUMENTS

| | | | | |
|---|---|---|---|---|
| DE | 3486336 | T2 | 3/1995 | |
| DE | 199 27 683 | C1 | 1/2001 | |
| DE | 10 2008 043718 | A1 | 5/2010 | |
| DE | 10 2009 006 062 | A1 | 7/2010 | |
| EP | 0 912 455 | B1 | 5/2006 | |
| EP | 1 917 222 | B1 | 5/2008 | |
| EP | 2 733 295 | A1 | 5/2014 | |
| EP | 2733295 | A1 * | 5/2014 | E06B 3/66366 |
| WO | WO-9834521 | A1 * | 8/1998 | E06B 3/66366 |
| WO | WO 2011/152569 | A1 | 12/2011 | |
| WO | WO-2015152011 | A1 * | 10/2015 | E06B 3/66309 |
| WO | WO 2016/091646 | A1 | 6/2016 | |
| WO | WO-2016091646 | A1 * | 6/2016 | E06B 3/66366 |
| WO | WO-2016091647 | A1 * | 6/2016 | E06B 3/66366 |

* cited by examiner

INSULATING GLAZING WITH INCREASED BREAKTHROUGH-RESISTANCE AND AN ADAPTER ELEMENT

CROSS REFERENCE TO RELATED APPLICATIONS

This application is the U.S. National Stage of PCT/EP2018/050489, filed Jan. 10, 2018, which in turn claims priority to European Patent Application No. 17153750.9 filed Jan. 30, 2017, the entire contents of all applications are incorporated herein by reference in their entireties.

The invention relates to an adapter element for connecting a pane to a spacer having a fastening groove, a method for producing an insulating glazing with an adapter element, and a use of the insulating glazing.

The insulating effect of glazings on buildings is a critical factor, particularly in terms of lower carbon dioxide emissions. However, the protective effect of glazings also plays a critical role in the design of new buildings. The standard DIN EN 356 regulates the testing of burglar-resistant glazings. It describes methods for testing for manual attack resistance and burglar resistance. The testing for burglar resistance is designed for the higher classes based on standardized hammer and axe strikes, wherein the effort for opening the glazing is determined. Burglar resistance is divided into three test classes P6B to P8B, wherein P6B corresponds to more than 30 hammer and axe strikes, P7B more than 50 hammer and axe strikes, and P8B more than 70 hammer and axe strikes.

U.S. Pat. No. 4,243,719 A, DE 3486336 T2, and DE 102008043718 A1 disclose plastic/glass laminates made of glass and polycarbonate or polymethyl methacrylate. The panes are areally bonded to one another via casting resins or laminating films. According to the prior art, lamination of the pane assembly is preferably carried out by autoclaving, wherein, usually, a thermoplastic polyurethane film is used between polymer panes and an adjacent glass pane for lamination. Such laminates do, indeed, offer very good stability and burglar resistance; however, the production process is expensive due to the large number of steps required, such as drying the polymer panes or autoclaving. Furthermore, the raw material costs for thermoplastic polyurethane films are high. Moreover, the insulating effect of the laminate is low compared to relevant insulating glazings.

EP 2,733,295 A1 discloses an insulating glazing comprising a first glass pane, a second glass pane, and, therebetween, a splinter-proof thermoplastic pane. The thermoplastic pane is bracketed by a U-shaped receiving groove of a receiving element, with the receiving element glued in each case via a spacer to the first glass pane and the second glass pane.

It is, consequently, the object of the present invention to provide an insulating glazing with increased breakthrough-resistance and to simplify a method for producing such an insulating glazing.

The object of the present invention is accomplished according to the invention by an adapter element for connecting a pane to a spacer having a fastening groove according to the independent claim 1, a method for producing, and use of an insulating glazing with the adapter element. Preferred embodiments of the invention are evident from the dependent claims.

The adapter element according to the invention for connecting a pane to a spacer having a fastening groove comprises at least a receiving profile for securing to the pane and a lower part for fixing the adapter element on the spacer.

The lower part of the adapter element is designed to form-fit the fastening groove of the spacer. The fastening groove forms a recess extending in the longitudinal direction of the spacer. The cross-sectional shape of the lower part is implemented to fit the fastening groove. The receiving profile connects to the lower part of the adapter element, with the receiving profile protruding completely beyond the fastening groove in the installed state. The receiving profile is U-shaped and includes two side legs that are are provided to rest at least partially against opposite surfaces of the pane in the circumferential edge region. Furthermore, the receiving profile has a bottom surface that is provided to bracket a circumferential edge of the pane and to thus fix the pane. Lateral fixing of the pane is ensured by the side legs of the adapter element, with the side legs and bottom surface of the receiving profile not mandatorily making contact, but merely delimiting the position of the pane. Such an adapter element simplifies the otherwise very complex production process of an insulating glazing with breakthrough-resistance effect, since the standardized spacer can be used for all breakthrough-resistance classes. Depending on the thickness of the at least one thermoplastic polymer pane, a protection class of P6B, P7B, or P8B is obtained.

Furthermore, the lower part of the adapter element is trapezoidal. Thus, the adapter element can form a so-called "dovetail connection" with the spacer. This increases the stability of the connection. Advantageously, the adapter element is formed in one piece. This is particularly advantageous in terms of the mechanical stability of the adapter element as well as simple, economical assembly.

In one embodiment of the invention, the receiving profile of the adapter element is U-shaped. The material thickness of the receiving profile is preferably 0.5 mm to 5 mm, particularly preferably 1 mm to 3 mm. In practice, the latter range in particular has proved to be a good compromise between adequate stability and the lowest possible thermal conductivity.

The receiving profile optionally includes an insert that prevents slippage of the third pane and resultant development of noise during opening and closing of the window. In this case, the receiving profile can be wider than the pane mounted therein such that the insert mentioned can also be inserted into the receiving profile. The insert contributes to the compensation of the thermal expansion of the third pane during warming such that, regardless of climatic conditions, tension free fixing is ensured. Alternatively, the insert can be installed only in partial regions of the receiving profile, for example, in an empty space between the bottom surface and/or the legs and the circumferential inner edge of the third pane. In this case, only the possible empty spaces within the receiving profile are completely or partially filled by the insert.

In another embodiment of the invention, the side legs are step-shaped and/or have a fir-tree-like structure on their surface facing the pane. The step-shaped side legs of the receiving profile are stepped such that the pane inserted in the receiving profile can be fitted into one of the levels. Since, as a result of the step-shaped progression of the side legs, the receiving profile has different widths, the adapter element does not have to be readjusted in the case of a change of pane thickness. This is particularly advantageous for the simplification of the production process since a standardized spacer can be used for all burglar resistance classes regardless of the thickness of the panes used.

The adapter element preferably contains polyethylene (PE), polycarbonates (PC), polypropylene (PP), polystyrene, polybutadiene, polynitriles, polyesters, polyurethanes, polymethyl methacrylates, polyacrylates, polyamides, polyethylene terephthalate (PET), polybutylene terephthalate (PBT), preferably acrylonitrile butadiene styrene (ABS), acrylonitrile styrene acrylester (ASA), acrylonitrile butadiene styrene/polycarbonate (ABS/PC), styrene acrylonitrile (SAN), PET/PC, PBT/PC, and/or copolymers or mixtures thereof. The adapter element can also be reinforced with glass fibers.

Alternatively, or additionally, the adapter element can contain a metallic material. The mechanical strength of metallic materials is usually higher than that of other materials. Also, metallic materials tend not to splinter in the event of forceful impact. Examples of suitable materials for producing the receiving profile are aluminum, iron, steel, stainless-steel, and/or mixtures and/or alloys thereof.

In a preferred embodiment, the receiving profile is formed in one piece from aluminum or aluminum alloys. Aluminum or aluminum alloys have the advantage that they have high specific strength at a low weight. Accordingly, when these materials are used, high edge strength and burglary security can be achieved without appreciably increasing the weight of the insulating glazing.

The present invention also provides a spacer for connecting at least two panes having a main body comprising a first pane contact surface and a second pane contact surface extending parallel thereto, a first glazing interior surface, a second glazing interior surface, an outer surface, a first hollow chamber, and a second hollow chamber. The spacer has a fastening groove extending parallel to the first pane contact surface and second second pane contact surface between the first glazing interior surface and the second glazing interior surface for receiving an adapter element according to the invention. Also, the first hollow chamber is adjacent the first glazing interior surface, and the second hollow chamber is adjacent the second glazing interior surface. The side flanks of the fastening groove are formed by the walls of the first hollow chamber and the second hollow chamber.

The spacer of the insulating glazing according to the invention can be implemented in one piece, as a result of which at least one first pane, one second pane, and one third pane can be mounted simply and precisely on this one-piece doubled spacer ("double spacer"). By means of the combination of a spacer with an adapter element according to the invention, which is provided to receive a polymer pane, an insulating glazing is thus made possible, which simultaneously meets the high thermal demands on modern insulating glazings and ensures penetration resistance and burglar security.

The main body preferably contains polyethylene (PE), polycarbonates (PC), polypropylene (PP), polystyrene, polybutadiene, polynitriles, polyesters, polyurethanes, polymethyl methacrylates, polyacrylates, polyamides, polyethylene terephthalate (PET), polybutylene terephthalate (PBT), preferably acrylonitrile butadiene styrene (ABS), acrylonitrile styrene acrylester (ASA), acrylonitrile butadiene styrene/polycarbonate (ABS/PC), styrene acrylonitrile (SAN), PET/PC, PBT/PC, and/or copolymers or mixtures thereof. Particularly good results were obtained with these materials. Preferably, the polymer main body is glass-fiber-reinforced. The polymer main body and the adapter element can have identical material composition.

In an alternative preferred embodiment, the polymer main body is made of wood or wood/polymer mixtures. Wood has low thermal conductivity and, as a renewable raw material, is particularly compatible ecologically.

The main body preferably has, along the glazing interior surfaces, a total width of 10 mm to 50 mm, particularly preferably of 20 mm to 36 mm. The distance between the first and the third pane or between the third and the second pane is determined by the selection of the width of the glazing interior surfaces. Preferably, the widths of the first glazing interior surface and the second glazing interior surface are the same. Alternatively, asymmetric spacers are also possible, with which the two glazing interior surfaces have different widths. The precise dimension of the glazing interior surfaces is governed by the dimensions of the insulating glazing and the desired sizes of the interpane spaces.

The fastening groove of the spacer is trapezoidal. It is provided to form a so-called "dovetail connection" with the lower part of the adapter element. The fastening groove extends in the longitudinal direction of the spacer. The lower part of the adapter element makes prying the pane out in the edge region difficult; and, thus, in combination with the spacer, substantially improves the edge stability of the glazing.

An insulating glazing that comprises at least a first pane, a second pane, a third pane, and a spacer according to the invention is considered preferable. The insulating glazing has an outer interpane space between the first pane, the second pane, and the outer surface of the spacer and a first inner interpane space between first pane, the third pane, and a first glazing interior surface of the spacer as well as a second inner interpane space between the second pane, the third pane, and a second glazing interior surface of the spacer. Further preferable, with such an insulating glazing, the first pane is bonded to the first pane contact surface via a seal; and the second pane is bonded to the second pane contact surface via a seal. In this case, the third pane is formed by at least one thermoplastic polymer pane and is inserted in the receiving profile of the adapter element.

Such an insulating glazing has a reinforced edge region and thus ensures higher burglary security. Moreover, the thermoplastic polymer pane of the third pane is situated completely within the insulating glazing, wherein it is surrounded by the first pane, the second pane as well as the adapter element of the spacer. Thus, the material of the thermoplastic polymer pane is protected against moisture. Additional advantages of the insulating glazing according to the invention compared to the known plastic/glass laminates of the prior art with increased burglar resistance are improved sound insulation as well as lower production costs. Corresponding savings result from the fact that no energy-intensive autoclave process for lamination of the panes is necessary and no laminating film is required between the panes. Moreover, thermal stressing of the thermoplastic polymer during the production process is avoided, as a result of which the polymer pane remains completely stress-free. Advantageously, the assembly according to the invention obtains, depending on the selection of pane thicknesses, the protection class P6B, P7B, or P8B.

Expediently, the receiving profile of the adapter element brackets the circumferential edge in the edge region of the third pane. Alternatively, the receiving profile can be mounted merely on partial regions of the circumferential edge, in particular on two opposite edges of the third pane.

In a preferred embodiment, on at least one pane edge, the third pane does not touch the bottom surface of the receiving profile. There thus remains, on at least one edge, an empty space between the third pane and the bottom surface of the receiving profile. This enables unimpeded longitudinal expansion of the thermoplastic polymer pane of the third pane and prevents the occurrence of stresses. In the case of a rectangular glazing, there is preferably at least one such empty space between the third pane and the bottom surface of the receiving profile on one of the two opposite sides in each case. Thus, unimpeded expansion along both pane edges of the third pane is possible. Said empty space can also be filled by an insert. The insert can contain an elastomer, preferably butyl rubber. This is easily compressible and does not impede the expansion of the third pane.

In a preferred embodiment, the thermoplastic polymer pane has a thickness of at least 3 mm.

In another preferred embodiment, the third pane comprises a plurality of panes and at least one thermoplastic polymer pane. In such an embodiment, the individual panes are bonded via laminating films to form the third pane.

In accordance with a further development of the insulating glazing according to the invention, the hollow chambers of the spacer contain a desiccant, preferably silica gels, molecular sieves, CaCl2, Na2SO4, activated carbon, silicates, bentonites, zeolites, and/or mixtures thereof. This is particularly advantageous with the use of polymer panes since a large number of polymer materials have high residual moisture on their surface.

In a preferred embodiment, the first glazing interior surface and/or the second glazing interior surface has at least one opening. Preferably, a plurality of openings are made on both glazing interior surfaces. The total number of openings depends on the size of the insulating glazing. The openings connect the hollow chambers to the interpane spaces, enabling a gas exchange between them. This allows absorption of atmospheric humidity by a desiccant situated in the hollow chambers and thus prevents fogging of the panes. The openings are preferably implemented as slots, particularly preferably as slots with a width of 0.2 mm and a length of 2 mm. The slots ensure optimum air exchange without desiccant being able to penetrate out of the hollow chambers into the interpane spaces.

The first pane and the second pane have a thickness of 2 mm to 50 mm, preferably 2 mm to 10 mm, particularly preferably 4 mm to 6 mm, wherein the two panes can also have different thicknesses. The third pane can have a thickness of 2 mm to 30 mm, preferably 2 mm to 20 mm, and particularly preferably of 4 mm to 12 mm.

In a possible embodiment, the thickness of the first pane is 3 mm, the thickness of the second pane 4 mm, and the thickness of the third pane 5 mm. Such an asymmetric combination of the pane thicknesses results in a significant improvement of acoustic damping.

In a possible embodiment, the first pane, the second pane, and/or the third pane can also be implemented as composite panes. In the case of the first pane and the second pane, this is advantageously a glass-glass composite of at least two glass panes that are adhesively bonded to one another via a laminating film. This further improves the burglar resistance of the insulating glazing according to the invention. Since, in this case, this is only a composite of two glass panes, even economical laminating films, made, for example, of polyvinyl butyral, can be used. Such a glazing according to the invention further has the advantage that the polymer pane of the third pane is fixed by the receiving profile and does not have to be laminated.

The first pane, second pane, or third pane of the insulating glazing have, optionally, a coating, in particular a so-called "low-E coating". The low-E coating is preferably applied on a glass pane. With low-E coatings, the thermal insulation capacity of the insulating glazing can be even further increased and improved. These coatings are thermal radiation reflecting coatings that reflect a significant portion of the infrared radiation, resulting, in summer, in reduced heating of residential space. Such coatings are known, for example, from DE 10/2009/006,062 A1, EP 0,912,455 B1, DE 19/927,683 C1, and EP 1,917,222 B1.

In another possible embodiment, the second pane of the insulating glazing is oriented in the direction of the protection side, i.e., the side of the pane on which the individuals or objects to be protected are situated, and is implemented as a composite pane comprising at least one glass pane and at least one thermoplastic polymer pane. The thermoplastic polymer pane is oriented toward the protection side and prevents splinters from being released into the protected area in the event of destruction.

The attack side of the glazing is defined as the outer pane side starting from which an attack on the glazing is likely to occur. In the case of a glazing for break-in protection, this is the side of the pane facing the exterior of the building. The protection side refers to the opposite side of the glazing, on which the object meriting protection or the individuals to be protected are situated. In the case of said use of the glazing for break-in protection, this would be the side of the glazing facing the building interior.

The interpane space of the insulating glazing is preferably filled with an inert gas, preferably with a noble gas, preferably argon or krypton, which reduce the heat transfer value in the interpane space.

The outer interpane space, delimited by the first pane, the second pane, and the outer surface of the spacer, is at least partially, preferably completely, filled with an outer sealing. Thus, very good mechanical stabilization of the edge seal is achieved.

The outer sealing preferably contains polymers or silane modified polymers, particularly preferably organic polysulfides, silicones, room temperature vulcanizing (RTV) silicon rubber, peroxide vulcanizing silicon rubber, and/or addition vulcanizing silicon rubber, polyurethanes, and/or butyl rubber.

The seal between the first pane contact surface and the first pane, or between the second pane contact surface and the second pane, preferably contains a polyisobutylene. The polyisobutylene can be a cross-linking or non-cross-linking polyisobutylene.

At the corners of the insulating glazing, the spacers are preferably linked to one another via corner connectors. Such corner connectors can, for example, be implemented as a molded plastic part with a seal. In principle, greatly varied geometries of the insulating glazing are possible, for example, rectangular, trapezoidal, and rounded shapes. For producing rounded geometries, the spacer can, for example, be bent in the heated state.

In a possible embodiment of the insulating glazing according to the invention, the polymer main body includes more than one fastening groove. The spacer can thus accommodate more than one center pane and be used for producing multipane insulating glazing with more than three panes. In this case, the fourth and further panes that are inserted in additional fastening grooves can be polymer panes, glass panes, or composite panes made of polymer panes and/or glass panes. Additional polymer panes increase the burglar resistance of the glazing.

The invention further includes a method for producing an insulating glazing that has the following steps:

a) Inserting the adapter element into the fastening groove of the spacer, b) Inserting the third pane into the receiving profile of the adapter element,
c) Bonding the first pane to the first pane contact surface of the spacer via a seal and bonding the second pane to the second pane contact surface of the spacer via a seal,
d) Pressing the pane assembly comprising the first, second, and third pane and the spacer, and
e) Sealing the entire insulating glazing unit.

When the third pane is a composite pane of multiple individual panes, this is laminated before or after step a), in any case before b), from the at least one thermoplastic polymer pane and the other panes.

The invention further includes the use of the insulating glazing according to the invention as a burglar-resistant glazing, preferably in the building interior, in the building exterior, and/or in façades.

Of course, the various embodiments can be realized individually or in any combinations. In particular, the features mentioned above and to be explained in the following can be used not only in the combinations indicated, but also in other combinations or in isolation, without departing from the scope of the present invention.

The invention is explained in the following with reference to drawings. The drawings are purely schematic representations and not true to scale. They in no way restrict the invention.

Figure 2:
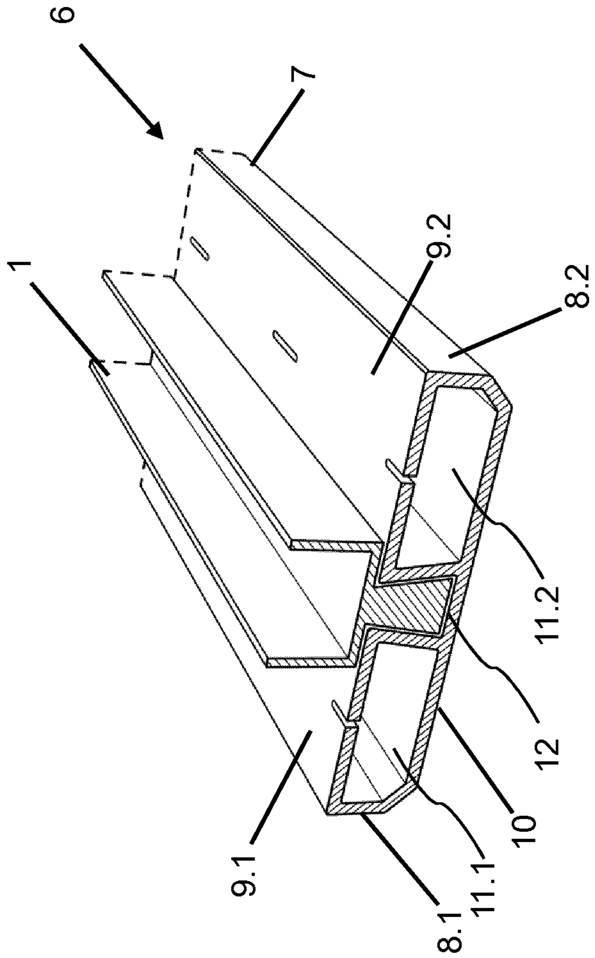
Figure 3:
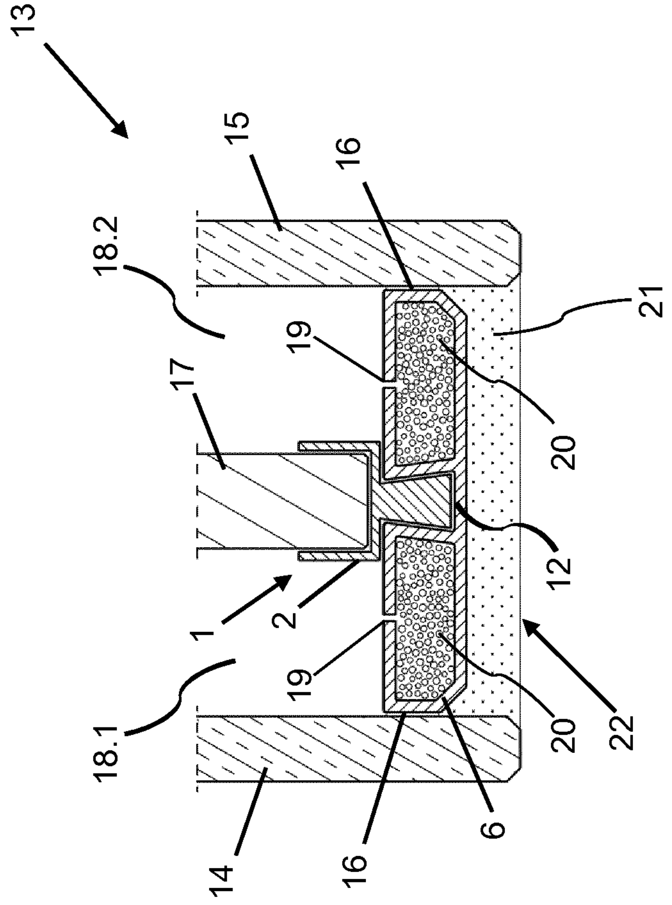
Figure 4:
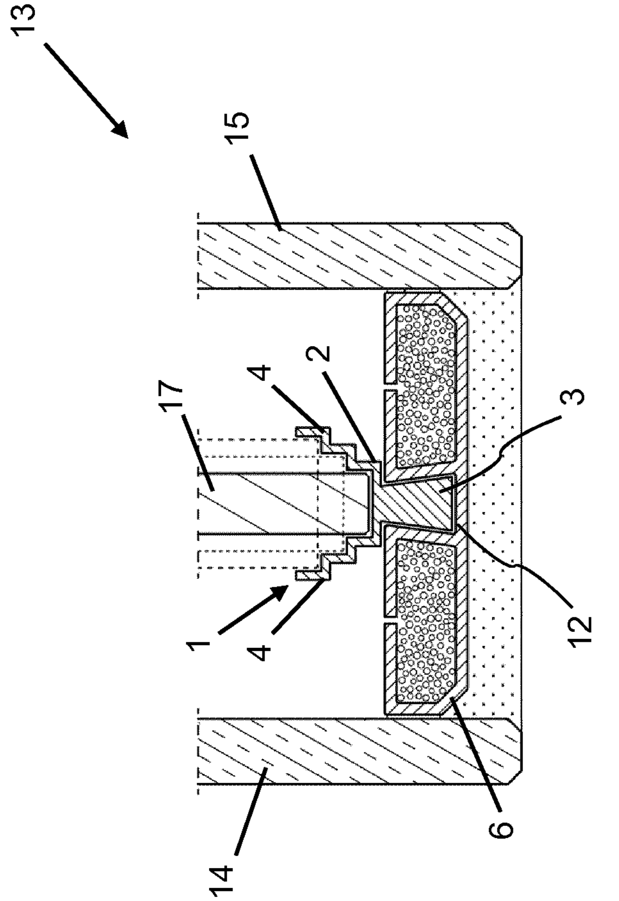
Figure 5:
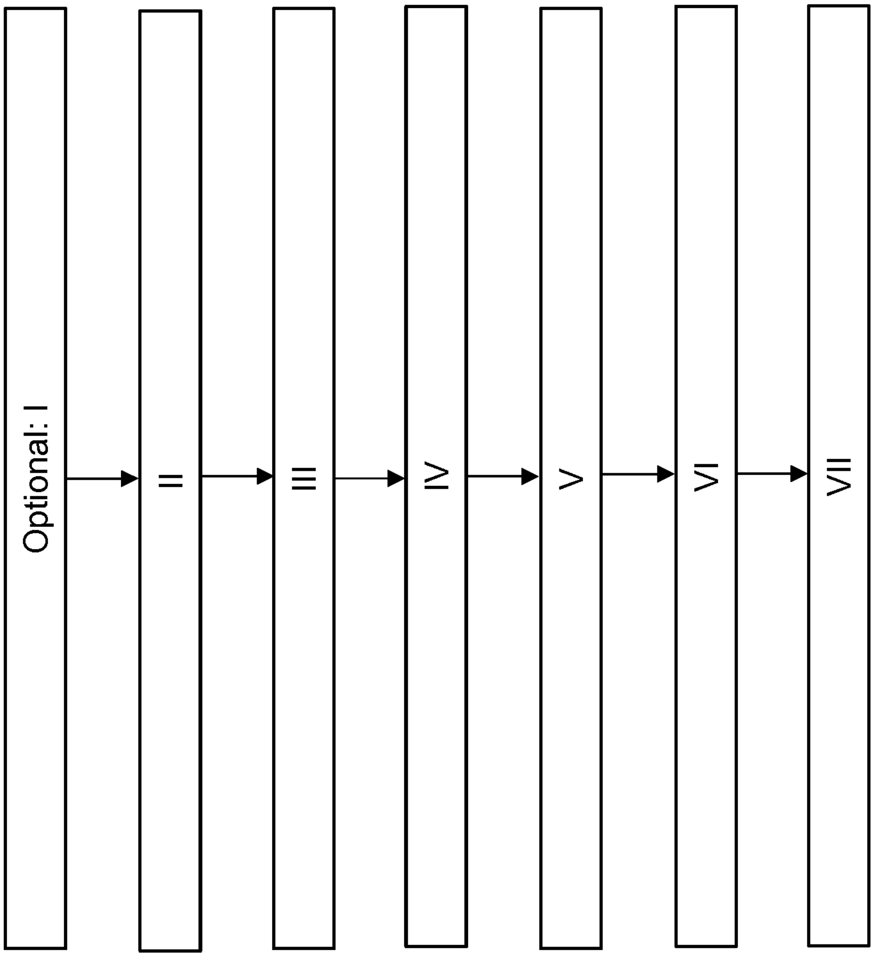

They Depict:

FIG. 1: a schematic representation of an adapter element according to the invention FIG. 2: a perspective representation of a spacer with an adapter element FIG. 3: a cross-section of an embodiment of the insulating glazing according to the invention, FIG. 4: a cross-section of another embodiment of the insulating glazing according to the invention, and FIG. 5: a flowchart of a possible embodiment of a method according to the invention.

FIG. 1 depicts a schematic representation of an adapter element 1 according to the invention that serves to connect a pane to a spacer having a fastening groove. The adapter element 1 has a U-shaped receiving profile 2 and a dovetail-shaped lower part 3 in the lower region. The receiving profile 2 serves for receiving and securing a pane on the adapter element 1 and the lower part 3 fixes the adapter element on the spacer.

The lower part 3 is implemented form-fittingly with a fastening groove of a spacer. For this, the cross-sectional shape of the lower part 3 is implemented in the form of a dovetail to fit the fastening groove of a spacer. This geometry of the lower part 3 improves the stability of the adapter element 1 in the installed state. The lower part 3 has a height of approx. 5 mm and thus corresponds to the depth of a matching fastening groove. The lower part 3 further has a maximum width of approx. 4.5 mm and a minimum width of ca. 3.2 mm. The receiving profile 2 connects to the lower part 3 of the adapter element 1. In the installed state of an insulating glazing, the receiving profile protrudes completely out of the fastening groove of the spacer. The U-shaped receiving profile 2 includes two side legs 4 that rest against opposite surfaces of the pane in the circumferential edge region in the installed state of an insulating glazing. The receiving profile 2 further has a bottom surface 5 that brackets a circumferential edge of the pane and, thus, fixes an installed pane. The side fixing of an installed pane is ensured by the side legs 4 of the adapter element 1, wherein the side legs 4 and bottom surface 5 of the receiving profile 2 do not mandatorily contact the pane, but merely delimit its position. The side legs 4 of the receiving profile 2 have a height of 12 mm.

The adapter element 1 implemented in one piece made of a polymer material. The adapter element 1 contains styrene acrylonitrile (SAN) with approx 35 wt.-% of glass fibers.

FIG. 2 depicts a perspective representation of a spacer 6 with the adapter element 1. The spacer 6 has a main body 7, which comprises a first pane contact surface 8.1 and a second pane contact surface 8.2 extending parallel thereto. The main body 7 further has a first glazing interior surface 9.1 and a second glazing interior surface 9.2 as well as an outer surface 10. The entire outer surface 10 extends perpendicular to the pane contact surfaces 8.1, 8.2 and connects the pane contact surfaces 8.1 and 8.2. The sections of the outer surface 10 nearest the pane contact surfaces 8.1 and 8.2 are inclined at an angle of approx 45° relative to the outer surface 10 in the direction of the pane contact surfaces 8.1 and 8.2.

The spacer 6 has a first hollow chamber 11.1 between the outer surface 10 and the first glazing interior surface 9.1, and a second hollow chamber 11.2 between the outer surface 10 and the second glazing interior surface 9.2. A fastening groove 12 extends between the two hollow chambers 11.1 and 11.2. The side flanks of the fastening groove 12 are formed by the walls of the first hollow chamber 11.1 and the second hollow chamber 11.2 such that the fastening groove 12 extends in the longitudinal direction of the spacer 6 and has a depth of 5 mm. The side flanks of the fastening groove 12 are inclined in the direction of the interior such that the fastening groove 12 has on its bottom surface a greater width than on its open side opposite the bottom surface. The maximum width of the fastening groove 12 is 4.5 mm, measured at its bottom surface. The minimum width of the fastening groove 12, measured at its open side, is 3.2 mm.

The main body 7 of the spacer 6 and the adapter element 1 contain identical materials. This has the advantage that the production process is particularly simplified and the adapter element 1 and the spacer 6 are particularly compatible. The spacer 6 has a height of 6.5 mm and a total width of 34 mm.

FIG. 3 depicts a cross-section of an embodiment of the insulating glazing 13 according to the invention and a circumferential spacer 6 with an adapter element 1 according to the invention. The spacer 6 is mounted between a first pane 14 and a second pane 15 arranged parallel thereto. The first pane 12 of the insulating glazing 13 is bonded to the first pane contact surface 8.1 of the spacer 6 via a seal 16, whereas the second pane 15 is bonded to the second pane contact surface 8.2 via a seal 16. The first pane 14 and the second pane 15 are made of soda lime glass with a thickness of 3 mm. The seal 16 is made of butyl rubber.

A third pane 17 is inserted in the receiving profile 2 of the adapter element 1 in its circumferential edge region. The third pane 17 is a thermoplastic polymer pane, a polycarbonate pane. The thickness of the third pane 17 is 8 mm. Such insulating glazings are referred to as triple insulating glazings.

The intermediate space between the first pane 14 and the third pane 17, delimited by the first glazing interior surface 9.1, is defined as the first inner interpane space 18.1, and the space between the third pane 17 and the second pane 15, delimited by the second glazing interior surface 9.2, is defined as the second inner interpane space 18.2. The inner interpane spaces 18.1 and 18.2 are connected to the respective underlying hollow chambers 11.1 or 11.2 via multiple openings 19 in the glazing interior surfaces 9.1 and 9.2. A desiccant 20, which removes the atmospheric humidity from the inner interpane spaces 18.1 and 18.2, is situated in the hollow chambers 11.1 and 11.2. The dehumidification of the interpane spaces has the advantage that a production step, namely the drying of the third pane in advance, is eliminated.

The lower part 3 of the adapter element 1 is inserted into the fastening groove 12 of the spacer 6. The shape of the lower part 3 was produced to match the fastening groove 12 and corresponds to a dovetail shape. The fastening groove 12 has, in contrast, a trapezoidal cross-section such that the lower part 3 makes a positive connection with the fastening groove 12. Such connections are particularly stable both transverse to the lower part 3 and also in its longitudinal direction.

The outer interpane space 21, which is delimited by the outer surface 10 of the spacer 6 and the first pane 14 and the second pane 15, is completely filled with the outer sealing 22.

This embodiment according to the invention advantageously presents increased burglar resistance compared to a triple insulating glazing known according to the prior art. Here, the insulating glazing according to the invention of FIG. 1 surprisingly reaches the protection class P6B, P7B, and P8B. Also, the embodiment of the insulating glazing according to the invention is advantageous in terms of simple processing during the production process, which requires no adjustments of the production plant or of the process regardless of the total thickness of the third pane. The thickness of the third pane can be designed variably, while the geometry of the spacer can remain unchanged. Since the third pane is inserted into the receiving profile 2 of the adapter element 1 and not directly into a fastening groove 12 of the spacer 6, the width of the fastening groove 12 is independent of the thickness of the third pane.

FIG. 4 depicts a cross-section of another possible embodiment of the insulating glazing 13 with adapter element 1 according to the invention. The basic structure corresponds to that described in FIG. 3. In contrast thereto, the side legs 4 of the receiving profile 2 are step-shaped. The side legs 4 rest against opposite surfaces of the third pane 17, wherein in each case one step of the side legs 4 fixes the third pane 17 in its position. The third pane 17 is inserted into receiving profile and has direct contact with the bottom surface of the receiving profile 2. Alternative thicknesses of the third pane 17 are depicted by dashed outlines. The embodiment of FIG. 4 has the advantage that the adapter element 1 can be produced independently of the thickness of the third pane 17.

FIG. 5 depicts a flowchart of a possible embodiment of the method according to the invention for producing an insulating glazing comprising the steps:

I Optionally: the first pane 14, the second pane 15, and/or the third pane 17 are laminated as a composite pane comprising at least two glass panes and/or thermoplastic polymer panes and at least one laminating film, wherein the third pane 17 includes at least one thermoplastic polymer pane II Inserting the adapter element 1 into the fastening groove 12 of the spacer 6

III Inserting the third pane 17 into the receiving profile 2 of the adapter element 1

IV Bonding the first pane 14 to the first pane contact surface 8.1 of the spacer 6 via a seal 16, and V Bonding the second pane 15 to the second pane contact surface 8.2 of the spacer 6 via a seal 16

VI Pressing the pane assembly comprising the first, second, and third pane 14, 15, 17 and the spacer 6

VII Complete filling of the outer interpane space 21 with an outer sealing 22.

LIST OF REFERENCE CHARACTERS

1 adapter element
2 receiving profile
3 lower part
4 side leg
5 bottom surface
6 spacer
7 main body of the spacer
8.1 first pane contact surface
8.2 second pane contact surface
9.1 first glazing interior surface
9.2 second glazing interior surface
10 outer surface
11.1 first hollow chamber
11.2 second hollow chamber
12 fastening groove
13 insulating glazing
14 first pane
15 second pane
16 seal
17 third pane
18.1 first interpane space
18.2 second interpane space
19 opening
20 desiccant
21 outer interpane space
22 outer sealing

The invention claimed is:

1. Adapter element for connecting a pane to a spacer having a fastening groove, wherein the adapter element comprises at least one receiving profile for securing to the pane and at least one lower part for fixing to the spacer, and the lower part is positively connected to the fastening groove of the spacer, wherein the at least one receiving profile is U-shaped and/or two opposite side legs of the at least one receiving profile are step-shaped.

2. The adapter element according to claim 1, wherein the at least one lower part of the adapter element is trapezoidal.

3. The adapter element according to claim 1, wherein the adapter element is formed in one piece.

4. The adapter element according to claim 1, wherein the adapter element contains polyethylene (PE), polycarbonates (PC), polypropylene (PP), polystyrene, polybutadiene, polynitriles, polyesters, polyurethanes, polymethyl methacrylates, polyacrylates, polyamides, polyethylene terephthalate (PET), polybutylene terephthalate (PBT), acrylonitrile butadiene styrene (ABS), acrylonitrile styrene acrylester (ASA), acrylonitrile butadiene styrene/polycarbonate (ABS/PC), styrene acrylonitrile (SAN), PET/PC, PBT/PC, and/or copolymers or mixtures thereof.

5. Spacer with a main body comprising a first pane contact surface and a second pane contact surface extending parallel thereto, a first glazing interior surface, a second glazing interior surface, an outer surface, a first hollow chamber and a second hollow chamber, a fastening groove extending parallel to the first pane contact surface and second pane contact surface between the first glazing interior surface and the second glazing interior surface in a longitudinal direction of the spacer, wherein the first hollow chamber is adjacent the first glazing interior surface, and the second hollow chamber is adjacent the second glazing interior surface, side flanks of the fastening groove are formed by the walls of the first hollow chamber and the second hollow chamber, and wherein the fastening groove has an adapter element according to claim 1.

6. The spacer according to claim 5, wherein the fastening groove is trapezoidal.

7. Insulating glazing at least comprising a first pane, a second pane, a third pane, and a spacer according to claim 5, an outer interpane space between the first pane, the second pane, and the outer surface of the spacer, a first inner interpane space between the first pane, the third pane, and a first glazing interior surface of the spacer, and a second inner interpane space between the second pane, the third pane, and a second glazing interior surface of the spacer, wherein the first pane is bonded to the first pane contact surface via a seal, the second pane is bonded to the second pane contact surface via a seal, the third pane is formed by at least one thermoplastic polymer pane, and an edge region of the third pane is arranged in the at least one receiving profile of the adapter element.

8. The insulating glazing according to claim 7, wherein the at least one receiving profile brackets a circumferential edge in the edge region of the third pane.

9. The insulating glazing according to claim 7, wherein the thermoplastic polymer pane has a thickness of at least 3 mm.

10. The insulating glazing according to claim 7 wherein the third pane comprises a plurality of panes and includes at least one thermoplastic polymer pane.

11. The insulating glazing according to claim 10, wherein the plurality of panes are bonded via laminating films to form the third pane.

12. The insulating glazing according to claim 7, wherein the circumferential edge of the third pane does not directly contact the bottom surface of the receiving profile.

13. Method for producing an insulating glazing according to claim 7, comprising a) inserting the adapter element into a fastening groove of a spacer, b) inserting the third pane into the receiving profile of the adapter element, c) bonding the first pane to the first pane contact surface of the spacer via a seal and bonding the second pane to the second pane contact surface of the spacer via a seal, d) pressing together the pane assembly comprising the first, second, and third pane and the spacer, and e) sealing the entire insulating glazing unit.

14. A method comprising utilizing an insulating glazing according to claim 7 as a breakthrough-resistant glazing in the building exterior, and/or in façades.

15. The method according to claim 14, wherein the insulating glazing is arranged in a building interior.

* * * * *